US006453024B1

United States Patent
Baker et al.

(10) Patent No.: US 6,453,024 B1
(45) Date of Patent: Sep. 17, 2002

(54) GRAPHICAL SOFTWARE FOR RECONFIGURING MODEMS HAVING AN ELECTRICALLY ADAPTABLE TELEPHONE LINE INTERFACE

(75) Inventors: Jennifer Baker, Park City; David Lindmeir, Layton, both of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/257,813

(22) Filed: Feb. 25, 1999

(51) Int. Cl.$^7$ .............................................. H04M 11/00
(52) U.S. Cl. .................. 379/93.29; 375/222; 379/93.05
(58) Field of Search ................ 379/93.26, 93.28–93.34, 379/441–443, 93.05–93.07, 912; 375/222

(56) References Cited

U.S. PATENT DOCUMENTS

| | | |
|---|---|---|
| 5,515,423 A | 5/1996 | Beck et al. |
| 5,712,977 A | 1/1998 | Glad et al. |
| 5,727,972 A | 3/1998 | Aldous et al. |

Primary Examiner—Wing Chan

(74) Attorney, Agent, or Firm—Workman, Nydegger & Seeley

(57) ABSTRACT

Methods and systems for configuring communication systems to access public telephone networks. communication systems, such as modems, that connect to public telephone networks are required to meet certain access requirements defined by the telephone network. The present invention provides a list of countries/locations to select from in configuring a communication system to operate with a particular telephone network. The methods and systems also include an import feature to address political changes such as the change of a country's name as well as telephone network equipment changes that necessitate modifying how a communication system and telephone network interact. Because political boundaries do not always indicate differing telephone access requirements, the present invention may also store a unique country/location identifier where the communication system groups political subdivisions together so that a configuration can be associated with a single country/location. The methods and systems further provide for the initial configuration of a communication system as well as for modifying the configuration of a communication system where the communication system needs to operate in distinct countries/locations from time to time. Depending on the circumstances, the present invention may function interactively or may be setup to configure a communication system without user interaction.

25 Claims, 5 Drawing Sheets

```
                    WORLDPRT.INI
410 ──┐
412 ──┼─→ [INTERNAL]
414 ──┤   Last Modem=0
416 ──┤   AutoUpdate=-1
          NoShow=0

420 ──┐
422 ──┼─→ [SUPPORT]
          0="modem.ini"
```

FIG. 4

```
                        MODEM.INI
510 ──── [INTERNAL]
511 ──── LastCommPort=0
512 ──── ATi3Response="3CCM156 56K Global Modem PC Card"
513 ──── FriendlyName="Megahertz 3CCM156 56K Global Modem"
514 ──── ModemType=0
515 ──── DefaultCountryID=1
516 ──── DefaultUniqueCountryID=1
517 ──── LastUniqueCountryID=-1

520 ──── [REGIONS]
522a ──── ; <region label> = <region name>
         ; Region name can't exceed 30 characters
524 ──── 0="North America"
526 ──── 1="Asia"
528 ──── 2="Western Europe"

522b ──── ; Countries by region...
         ; <country label> = <firmware country ID> , <flag ID>, <country name>
         ; The country label must start with 0 and be continuously numbered
530 ────
532 ──── [North America]
         0=0,22,"USA",1

540 ────
542 ──── [Asia Pacific]
         0=1,197,"Japan"

550 ────
552 ──── [Western Europe]
554 ──── 0=2,59,"France"
556 ──── 1=3,60,"Germany"
         2=4,78,"Spain"
```

FIG. 5

GRAPHICAL SOFTWARE FOR RECONFIGURING MODEMS HAVING AN ELECTRICALLY ADAPTABLE TELEPHONE LINE INTERFACE

BACKGROUND OF THE INVENTION

1. The Field of the Invention

The present invention relates generally to methods and systems for configuring a communication system. More particularly, the present invention relates to methods and systems for configuring a communication system to access a telephone network according to the electrical requirements imposed by the telephone network.

2. Present State of the Art

Communication systems, such as modems, that connect to public telephone networks are required to meet certain access requirements defined by the telephone network. These access requirements include provisions for physically protecting the telephone network's equipment as well as provisions defining how the communication system must interact with the telephone network. For example, one standard requires electrical isolation between modems or other communication systems and the telephone network. These isolation requirements are formulated by agencies such as the Federal Communications Commission in the United States and corresponding regulatory agencies in other countries to prevent accidental injection of potentially harmful or extraneous signals through the telephone network.

Although specific regulations and access requirements may vary from one country to another, certain electrical circuits have established themselves as useful in meeting the requirements of most regulatory agencies. A data access arrangement (DAA) is one circuit that has proved beneficial in meeting various electrical isolation requirements. Communication systems in general, and modems in particular, may need to interact with multiple telephone networks having distinct access requirements. Furthermore, manufacturers of communication systems may prefer to manufacture a single product capable of interacting with many telephone networks, the single product being configured to operate with a specific telephone network at the time of installation.

An environment where a communication system is connected to a public telephone network may include a modem operably coupled to a host that connects to a public telephone network. To meet the access requirements of a public telephone network, the modem may employ a DAA, the DAA providing electrical isolation between the public telephone network and communication system. Where a modem is designed to function in multiple countries, the DAA must be capable of being configured to meet the varying requirements imposed by individual public telephone networks.

A modem may be designed to work in multiple countries for one of several reasons. For example, the modem may be designed for use with a laptop computer that may need to access public telephone networks worldwide. Alternatively, it may be economically unwise to manufacture custom modems for each unique telephone network because this would require distributors to maintain an inventory of each type. Therefore, a single, configurable modem that is capable of functioning with more than one telephone network may be more attractive. In either case, those skilled in the art have recognized a need to provide communication systems than can be configured to operate in any part of the world.

To meet this need, international modems have been developed that are designed for use in many countries worldwide. Many of these modems have been specifically designed to alternate between configurations depending on the location of the modem. For example, where a laptop computer user travels between multiple countries/locations, the modem will need to be configured for each destination to insure proper operation. Similarly, modems designed for operation in any one of several countries/locations, while not necessarily required to change from one configuration to another, nevertheless must be configured initially.

However, traditional methods and systems for configuring modems have suffered from several shortcomings. Specifically, constant political change has made it difficult to offer an accurate selection of countries/locations, especially where the country/location selections are stored in the modem's firmware. Therefore, traditional modem configuration methods and systems have offered a limited number of country/location choices. Furthermore, traditional methods and systems for configuring modems have provided limited capabilities for updating the list of supported countries/locations. Again, where the selections are stored in a modem's firmware, updating the list is a significant task requiring physical handling of the modem.

Due to the foregoing difficulties, some traditional modem configuration systems and methods group together countries with similar access requirements. While this approach allows for the appearance of supporting many countries/locations, it is not an ideal solution. For example, the groupings may not list each and every country/location, requiring the user to know which countries/locations have similar access requirements. Furthermore, the grouping approach may present users with an extensive list of countries/locations to chose from and then map the users' selection to another country/location with similar access requirements. This approach works well for the initial configuration because the user is presented with unambiguous choices from which to select. However, subsequent diagnostics or configuration will lead to confusion because when the modem is queried for its current configuration, it will report the mapped selection rather than the users actual selection, leaving some question in the user's mind if the modem is correctly configured.

OBJECTS AND BRIEF SUMMARY OF THE INVENTION

The problems in the prior state of the art have been successfully overcome by the present invention which is directed to methods and systems for configuring a communication system to meet the access requirements of a public telephone network. The present invention provides methods and systems for configuring a communication system that may be updated without physically handling the communication system to be configured. Furthermore, these methods and systems present a list of configuration options representing virtually every country/location, in the world. Moreover, the methods and systems of the present invention, also alleviate the problems associated with grouping multiple countries/locations into a single configuration option.

More specifically, in a preferred embodiment of the present invention, a personal computer containing a modem that needs to access a public telephone network executes computer code to configure the modem. The computer code identifies the currently selected or default country/location, identifies the modem to be configured if it can be accessed, and presents the user with a list of countries/locations from which to make a selection. The country/location flag is included with country/location name to aid a user in making the correct selection. The user may limit the number of countries/locations that are displayed by selecting a geographic region. Furthermore, the user can optionally select from advanced options that allows for importing additional countries/locations. This feature is useful when the names of countries/locations change or when the access requirements of a particular country/location need to be updated.

It is, therefore, an object of the present invention to provide methods and systems for configuring a communication system to meet the access requirements of a public telephone network.

It is a further object of the invention to allow a user to chose from virtually every identified country/location in the world during the configuration.

It is yet another object of the invention to provide methods and systems for adding or updating the country/location selections available.

It is also an object of the invention to track the actual country/location selected where the communication system groups several countries/locations together in a single configuration choice.

Additional objects and advantages of the invention will be set forth in the description which follows, and in part will be obvious from the description, or may be learned by practicing the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 illustrates the data structure of a file used by a preferred embodiment of the present invention in identifying and configuring a modem; and FIG. 5 illustrates the data structure of a file used by a preferred embodiment of the present invention to configure a particular modem referenced by the file shown in FIG. 4.

DETAILED DESCRIPTION OF THE PREFERRED EMBODIMENTS

Figure 1:
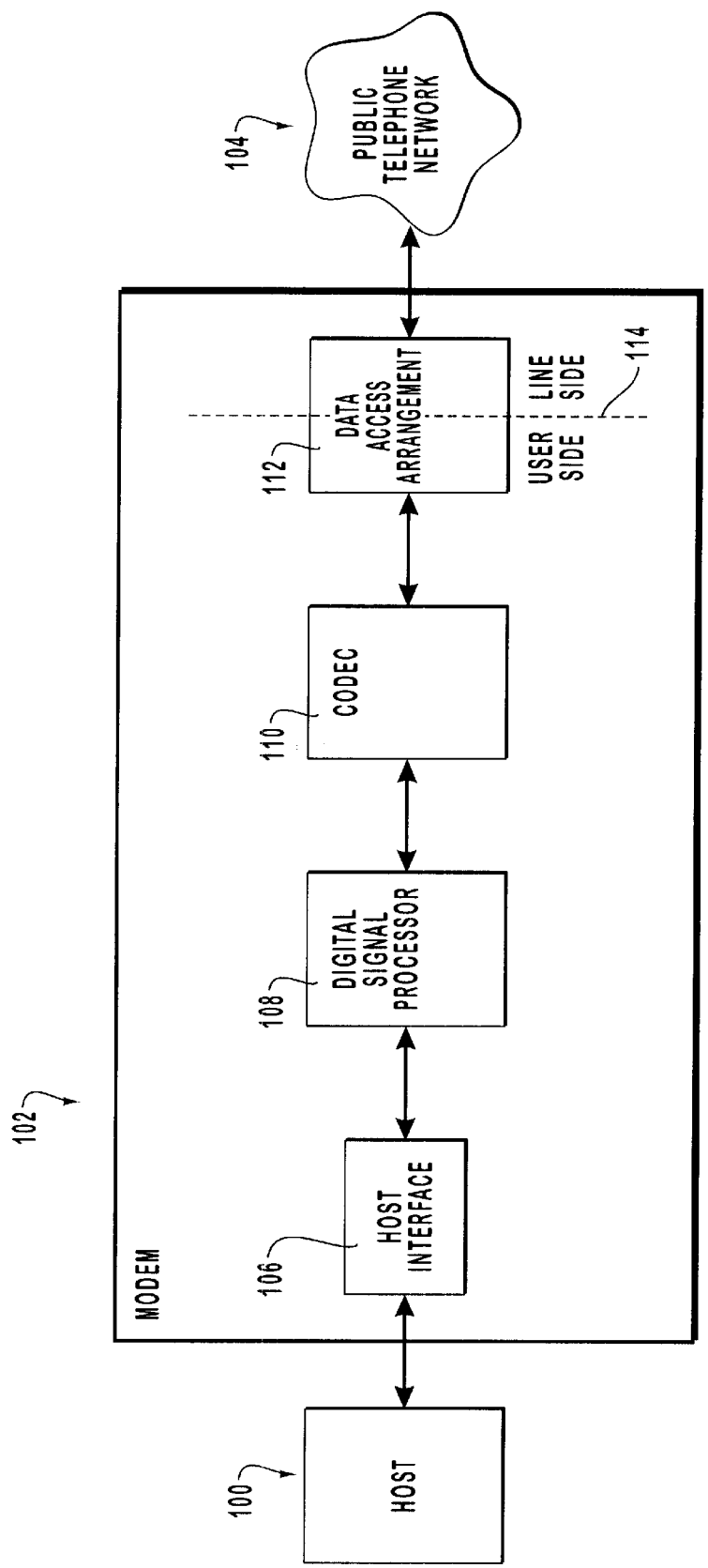
FIG. 1 is an example communication system providing a suitable environment for practicing the present invention.

The present invention concerns methods and systems for configuring a communication system according to the access requirements of a network such as a public telephone network. Such access requirements involve physically protecting the equipment of the telephone network as well as defining how to interact with the telephone network. The standards are formulated by various regulatory agencies around the world and may vary from one country/location to another. Therefore, when communication systems are used in multiple countries/locations, such as might be the case where a laptop computer with a modem accompanies an international traveler, it is necessary to configure the communication systems for use in each country/location. Furthermore, communication systems manufacturers may chose to make a single product capable of operation in multiple countries/locations. These international communication systems require initial configuration for the proper country/location prior to use.

Traditional methods and systems for configuring communication systems have suffered from several deficiencies addressed by the present invention. Specifically, traditional systems have presented users with a limited selection of countries/locations from which to chose due to the constant change in political boundaries and telephone network equipment. Furthermore, traditional systems have lacked a means for updating the available countries/locations without physically handling the communication system. Thus, some traditional configuration methods and systems have grouped countries/locations based on similar access requirements. While the grouping solution may be adequate for initial configuration, diagnostics and reconfiguration is more problematic because the initial configuration entails a one-way mapping of multiple countries/locations to a single country/location. Subsequent attempts to view configuration information reveal the mapped configuration rather than the one actually selected.

In contrast, the methods and systems of the present invention, as described below with regard to a preferred embodiment, allow selecting from virtually every country/location in the world. Moreover, the methods and systems of the present invention allow for adding or updating the choices of supported countries/locations without physically handling the communication system. Where communication systems map multiple countries/locations to a single configuration selection, the methods and systems of the present invention track the actual selection made so that subsequent inquiries can report the actual selection made.

The invention is described below by using diagrams to illustrate either the structure or processing of embodiments used to implement the methods and systems of the present invention. Using the diagrams in this manner to describe the invention should not be construed as limiting its scope. The present invention contemplates both methods and systems for operably and compatibly configuring a communication systems. Embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer. When information is transferred or provided over a network or other communication connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Specifically, FIG. 1 shows host 100, a personal computer in the preferred embodiment, and modem 102 as the communication system needing to be configured for operation with public telephone network 104. Modem 102 is required to modulate and demodulate electronic data as it passes between the analog format of public telephone network 104 and the digital format required for personal computer 100. Modem 102 is further comprised of host interface 106 for exchanging data with personal computer 100. Modern digital signal processors (DSP) such as DSP 108 provide the required modulating and demodulating of electronic data. CODEC 110 provides the transformation between digital and analog data depending of whether the information is intended for public network 104 or personal computer 100. The functionality and composition of host interface 106, DSP 108, and CODEC 110 are generally known in the art and need not be discussed further.

Because host 100 and modem 102 represent user equipment external to telephone network 104, modem 102 must incorporate a means for implementing the isolation requirements dictated by the regulatory agency controlling telephone network 104. Modem 102 shows data access arrangement (DAA) 112 for providing the required isolation for protecting telephone network 104 from extraneous and possibly harmful signals. To prevent these extraneous and possibly harmful signals from passing between personal computer 100 and telephone network 104, DAA 112 establishes isolation boundary 114 wherein signals generated by personal computer 100 must be coupled across isolation boundary 114 in order to reach telephone network 104.

Figure 2:
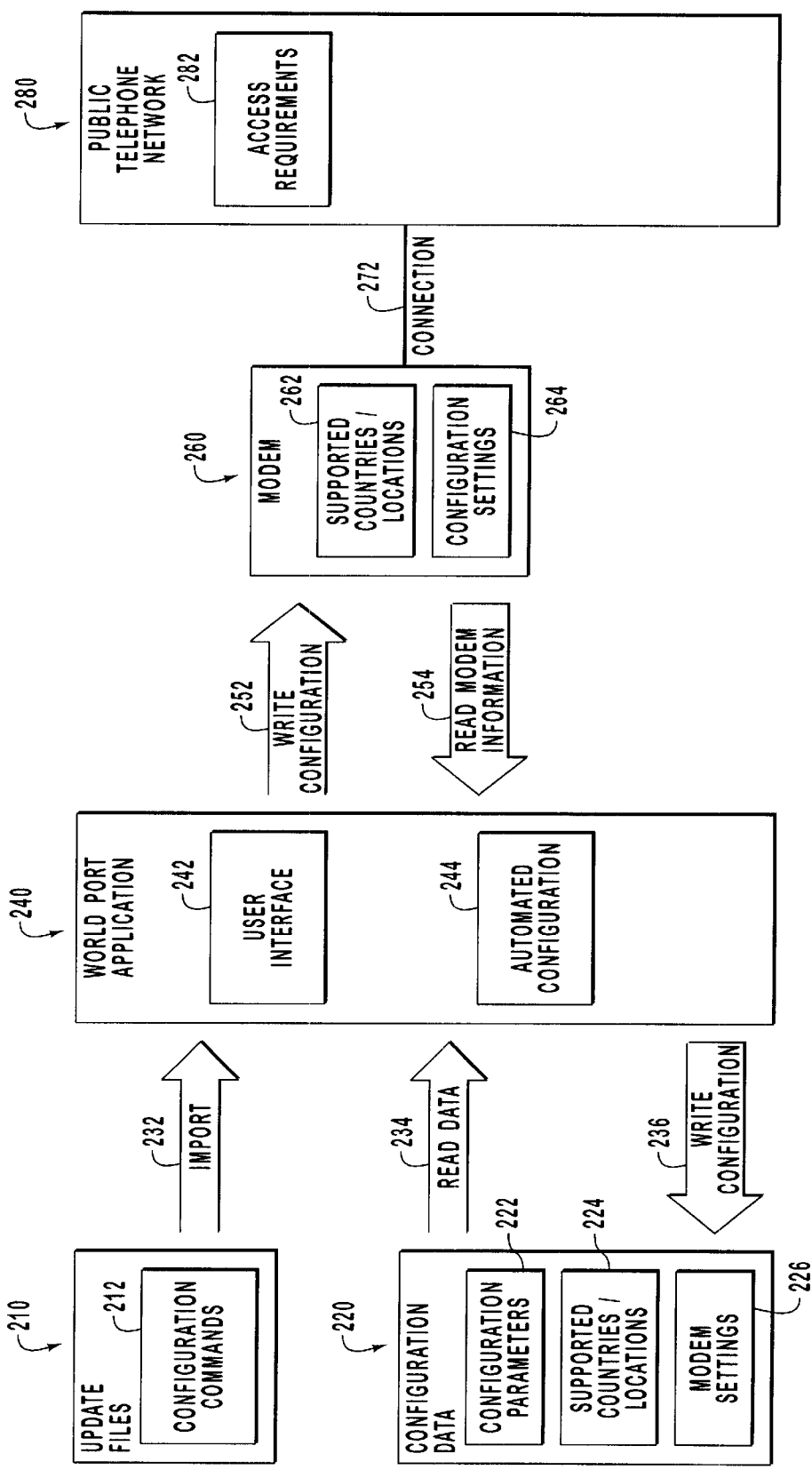
FIG. 2 illustrates an overview of the flow of information that occurs in a preferred embodiment of the present invention.

Devices like modem 102 that are capable of operation in more than one country/location must include the ability to configure the device to the varying access requirements of different telephone networks. FIG. 2 illustrates an overview of the flow of information that occurs while a preferred embodiment of the present invention configures a modem and FIG. 3 describes the operation of that preferred embodiment, referred to as the WorldPort application. The WorldPort application comprises computer-executable instructions implementing the methods and systems for configuring a communication system. Specifically, the WorldPort application configures modem 102 to meet the access requirements of a given country/location. Although the description below of FIG. 3 refers to the WorldPort application from the perspective of its user interface, the WorldPort application is capable of functioning transparently, performing its configuration without user interaction. The information presented later with regard to FIGS. 4 and 5 describes how to specify the parameters that determine the WorldPort application's behavior.

Turning back to FIG. 2, an overview of the flow of information that occurs as WorldPort application 240 configures modem 260 is presented. The operation of each functional element illustrated is described in detail as additional figures are introduced and discussed. Returning to the overview, WorldPort application 240 uses configuration data 220 to control program execution. For example, configuration parameters 222 may specify whether WorldPort application 240 presents user interface 242 or operates transparently through automated configuration 244. Supported countries/locations 224 dictates the available selections for configuring modem 260 and modem settings 226 may report the current configuration of modem 260. Update files 210 contain configuration commands 212 that may be used to provide more recent information than is provided by supported countries/locations 224.

During execution, WorldPort application 240, not only reads information as indicated by the import 232 or read data 234 references, but may also write information back to configuration data 220 for updating modem settings 226 or altering configuration parameters 222. It may become necessary to alter configuration parameters 222 as WorldPort application 240 progresses through the configuration process. Perhaps configuration must occur in two stages, one that requires user interface 242 and one that is subsequently performed without user intervention through automated configuration 244.

Furthermore, WorldPort application 240 reads information from modem 260 as indicated by read modem information 254 and writes modem configuration data as shown in write configuration 252. Modem 260 contains an internal list of available configurations as represented by supported countries/locations 262. This internal modem list corresponds to supported countries/locations 224 list of configuration data 220. One means of configuring modem 260 is by specifying a country/location contained within supported countries/locations 262. Another means of configuring modem 260 includes writing configuration commands 212 from update files 210 to modem 260. Configuration settings 264 indicate that modem 260 stores the configuration information received from WorldPort application 240.

WorldPort application 240 also reads information from modem 260 as illustrated by read modem information 254. It may be necessary to read information when WorldPort application 240 is searching for the modem to configure. WorldPort application 240 may request a modem identification string from modem 260 to compare with a string stored in configuration parameters 222 to insure that only a specific modem is configured. WorldPort application 240 may also perform certain diagnostic operations that require reading information from modem 260.

Once properly configured, modem 260 complies with access requirements 282 mandated by public telephone network 280 and may communicate through connection 272. As modem 260 moves from one country/location to another, WorldPort application 240 can repeat the foregoing to reconfigure modem 260 according to the access requirements of a new country/location. Alternatively, WorldPort application 240 may be used for the initial configuration of a modem that is capable of operation in multiple countries/locations, but will only be used in a single country/location. Thus, configuration data 220 and more specifically, configuration parameters 222, supported countries/locations 224, and modem settings 226 may be tailored to configure modem 260 for one specific country/location.

Figure 3:
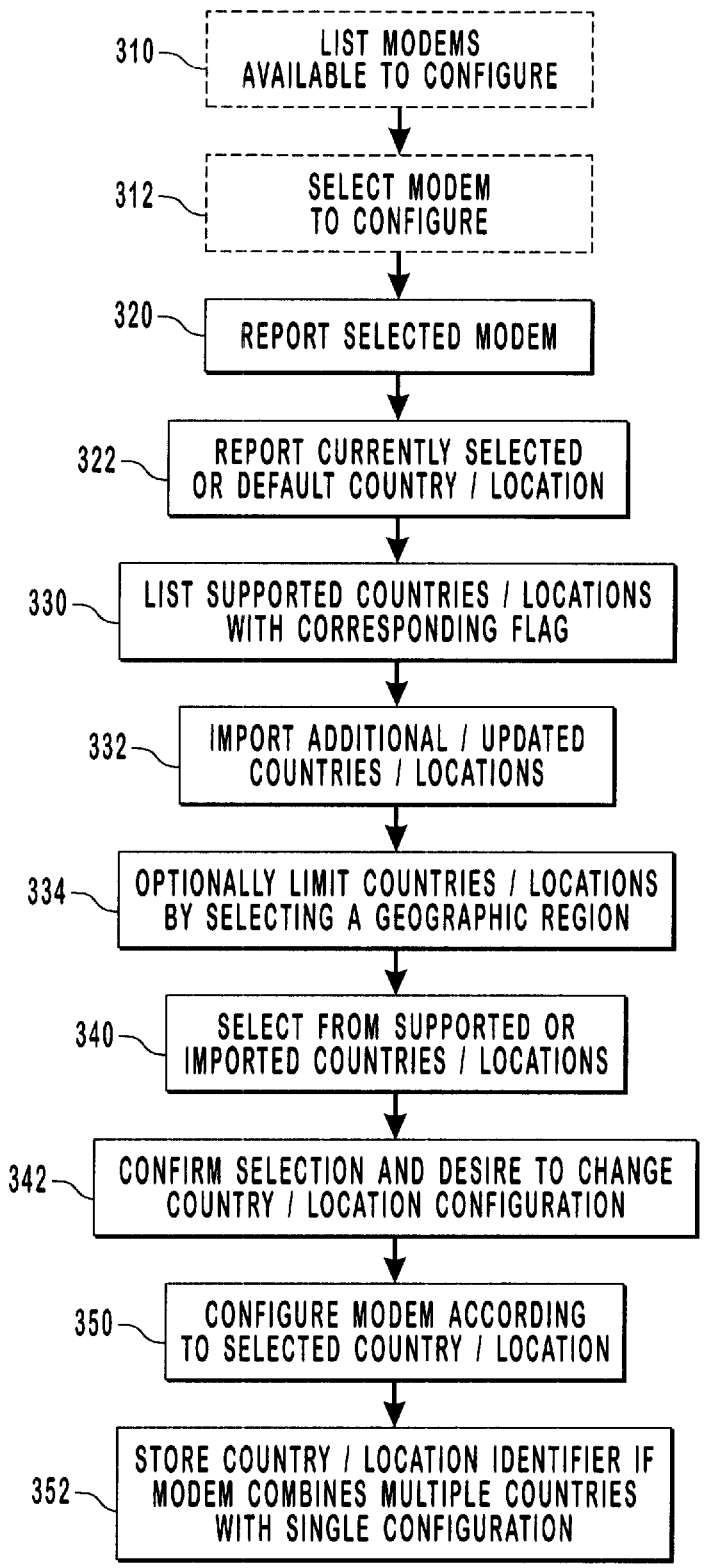
FIG. 3 illustrates the steps taken by a preferred embodiment of the present invention in configuring a modem.

Referring now to FIG. 3, the steps performed by a preferred embodiment of the present invention are illustrated. Steps 310 and 312 are shown in broken lines to indicate that a personal computer executing the WorldPort application will ordinarily include one modem only. Therefore, as currently implemented, the WorldPort application does not perform steps 310 and 312. Nevertheless, steps 310 and 312 will be described because the design of the WorldPort application contemplates supporting multiple modems and the WorldPort application as defined herein, contemplates such functionality within its scope. Thus, in step 310 the WorldPort application presents a list of modems that are available to be configured. Alternatively, the WorldPort application may have no knowledge relating to the modem it is to configure when the application first begins executing. In this case it may be necessary for the WorldPort application to search all available ports for an attached modem. Rather than presenting multiple modems, step 310 would list a single modem that the WorldPort application found in its search. In step 312, the modem to be configured is selected from the list so that step 320 can provide the WorldPort application user with visual feedback regarding the modem chosen for configuration. Step 320 may include displaying the computer port to which the modem is assigned, a text string describing the selected modem, and its current status.

The modem having been selected, step 322 reports the currently selected or default country/location for which the modem is configured by displaying both the country/location name and flag. Where a modem has been previously configured, step 322 reports the actual country/location configuration. However, if the WorldPort application is being used as part of a setup process for a newly installed modem, step 322 may report the default country/location rather than the one for which the modem is actually configured. This functionality is desirable where a single, mass-produced, modem is sold internationally. By step 322 reporting the default country/location code, a single modem, that in reality is configured for a single country/location, appears to be one customized for the market where it was sold. Furthermore, modem inventories need not include distinct physical devices for each potential market. Rather, each market only requires individualized setup and configuration parameters for the WorldPort application to use as it executes.

In step 330, the WorldPort application displays a list of virtually every country/location in the world along with the country/location flag to provide a visual cue for each one listed. From this list, the user selects the new country/location for which the WorldPort application will configure the modem. The default selection from the list functions similarly to the default selection described above in step 322. Because political boundaries and telephone equipment are subject to relatively frequent change when the list of supported choices includes virtually every country/location in the world, the WorldPort application also offers an import option. Step 332 allows a user to import a new country/location selection into the WorldPort application, reflecting both political and equipment changes. Any imported country/location name will have the word "Imported" appended it. If a user needs to move the modem to another computer, the WorldPort application also includes an export option (not shown) for regenerating the import file.

However, to improve the import option functionality, the modem should include the ability to store at least one user-defined configuration. The WorldPort application sends the configuration data contained in the import file to the modem and then requests the modem to store the data in its user-defined area so the modem can properly initialize itself each time the personal computer reboots; otherwise, the configuration data would need to be resent from the import file. If the number of countries/locations makes selection difficult, step 334 provides the option of selecting a geographic region to limit the displayed choices.

In step 340, the user selects one country/location from those displayed. The selection represents the country/location for which the modem should be configured. To guard against accidental changes, the WorldPort application step 342 confirms both the user's selection and desire to change the modem's country/location configuration. Once confirmed, the modem is configured in step 350 according to the selected country/location. If the modem supports only a limited number of country/location configurations, it may be necessary to map what appear to be multiple choices into one of the similar supported configurations. This mapping is one-way and, if queried, the modem would report its configuration as the mapped rather than the selected country/location. Therefore, the WorldPort application may need to store the user's actual selection so that when step 322 above is later executed, it will report the same country/location that the user selected. If step 322 were to report the mapped value returned by the modem, it would appear to the user that the modem is configured for a country/location other than the one that had been selected earlier. Step 352 may also be important for displaying the appropriate flag for a given country/location. If the country/location selection supports multiple political subdivisions with distinct flags, storing the users actual country/location selection will allow step 322 to display the correct flag.

FIG. 4 shows a parameter file used by the WorldPort application. The file name WORLDPRT.INI is essentially an arbitrary selection corresponding only to the name of the executable file comprising the computer-executable instructions of the methods and systems of a preferred embodiment of the present invention. Use of a file having an INI extension is well know in the art of programming a personal computer and will not be explained further. However, the invention is in no way limited by use of a file having an INI extension. Other mechanisms for communicating parameters to be used by a computer program, such as the registry of Windows95, Windows98 and WindowsNT, command line arguments and switches, etc., are also within the scope of the present invention.

Internal section 410 contains fields that control how the WorldPort application will function. For example, LastModem 412 tracks the most recent modem the WorldPort application has configured. Where multiple modems are supported, the WorldPort application defaults to the modem specified in this field so that the user need only specify the modem to be configured when it is something other than the one most recently configured. The value corresponds to an entry under the Support section 420.

AutoUpdate 414 configures a modem to the country/location specified in this field without displaying the normal user interface when its value is set and is other than −1. However, the default behavior of AutoUpdate 414 displays a success or failure confirmation after the WorldPort application attempts to configure the selected modem. Typically, AutoUpdate 414 is useful when the WorldPort application cannot find the user's modem during setup. For example, if certain drivers are required for modem installation that require rebooting the personal computer, the WorldPort application will not be able to communicate with the modem during setup. Nevertheless, the WorldPort application can be set to execute after rebooting with AutoUpdate 414 set to the appropriate country/location value since the needed drivers will be loaded during the reboot. NoShow 416 can be used to alter the default behavior of AutoUpdate 414.

NoShow 416 is only intended for use with AutoUpdate 414. When NoShow 416 is set to 1, the success or fail messages after the WorldPort application attempts to configure the modem are not displayed. This allows the WorldPort application to transparently configure the selected modem. For example, when it is known that a personal computer will need to be rebooted before the modem can be accessed, it may be desirable to give the appearance that the modem is configured prior to rebooting, even though the actual configuring will not occur until after the reboot. If the impression is given that the modem has already been configured, a confirmation message on reboot may only serve to confuse the user. NoShow 416 allows for flexibility in the information reported to the user.

As mentioned above, Support section 420 contains a list of all modems that may be configured. The "0=" in entry 4 corresponds to LastModem 412 in the example file shown in FIG. 3. "modem.ini" refers to the modem specific file illustrated in FIG. 5. Again, the name is an arbitrary selection and "modem.ini" is only intended as a generic reference. As discussed above, the invention is not limited to use of an INI file, other mechanisms for communicating information to be used by a computer program are also within the scope of the present invention. Support section 420 should contain an entry for every modem that the WorldPort application intends to support. In the preferred embodiment, the list must start with zero and be incremented by one for each succeeding entry.

FIGS. 5 illustrates a typical modem specific file containing the configuration details for a particular modem. Internal section 510 contains fields used to identify a modem and its current configuration. LastCommPort 511 tells the WorldPort application the last communication port where the modem was found to help reduce the time that would otherwise be required to search communication ports for the modem each time the WorldPort application is launched. ATi3Response 512 identifies the string that an ATI3 command should elicit from the modem to be configured. If the value of ATi3Response matches the ATI3 string returned, the WorldPort application will find the modem. FriendlyName 513 contains the name that the WorldPort application displays for the modem that matches the ATi3Response 512 string. Preferably, FriendlyName 513 matches the friendly name the manufacturer uses in the INF installation file so it is more likely to be recognized by the user. The function of INF files is well known in the art of programming personal computers and will not be described further. ModemType 514 is used to indicate any specialized processing that has to occur for a particular modem.

DefaultCountryID 515 serves two purposes. First, DefaultCountryID 515 specifies the country/location identifier the WorldPort application defaults to if the modem cannot be found and the WorldPort application is running to initially configure the modem. Second, DefaultCountryID 515 indicates to the WorldPort application which country/location should be initially selected as a default when the program begins execution. By defaulting to DefaultCountryID 515, the WorldPort application makes it appear as if the modem were manufactured for that specific country/location, when in fact, the modem may be configured at manufacturing time for another country/location. For example, a modem manufactured in the United States may be initially configured for operation in the United States. However, if Default Country ID 515 is set to France, when the WorldPort application executes, it will show France as the default country/location, giving the impression that the modem was designed specifically for France.

The WorldPort application accepts a case sensitive /S command line argument to specify that it is being run for initial configuration or Setup. /S turns off the verification message that confirms the users desire to change the configuration because setup implies initial configuration. It also suppresses display of the Advanced Tab from the WorldPort application's user interface, preventing the user from selecting options like import that allow for adding or updating countries/locations from what the "modem.ini" contains. Importing is described more fully below in regard to adding countries/locations. /S also tells the WorldPort application to look in "modem.ini" for a default country/location flag to select.

The WorldPort application may be distributed with WORLDPRT.VXD to allow for the country/location identifier to be set from the registry of an operating system like Windows95, Windows98, or WindowsNT rather than from DefaultCountryID 515 in the "modem.ini" file. Virtual device drivers or VDX files are well known in the art of programming personal computers and will not be discussed further. If WORLDPRT.VXD is not distributed with the WorldPort application or if the operating system does not include a registry, the DefaultCountryID 515 value is used to set the country/location identifier. Regardless of how it obtains the country/location identifier, the WorldPort application will default to this value as the one to use in configuring the modem before displaying the interface. Thus, from the user's perspective, it will appear the modem was shipped already configured with the settings that correspond to the country/location identifier even though the actual setting may be something entirely different. This approach has the advantage that a single modem can be manufactured and configured, yet the WorldPort application will make it appear as if the modem were specifically manufactured for the given country/location.

Although the WorldPort application is a necessary tool for modems that may travel from one country/location to another, it is also useful where a single modem will be sold around the world. When used to configure a modem for a specific country/location, the WorldPort application may be used together with a setup program. The setup program may copy the WorldPort application to a temporary directory where it will be used only for a one-time configuration of the modem. For use in this context, AutoUpdate 414 is set to the specific country/location and NoShow 416 is set to one. The "modem.ini" file need not contain any regions or countries in this case, only the modem identification entries are required.

Alternatively, the WorldPort application supports a case-insensitive /NOSEARCH command line argument to skip searching for a modem and report that no modem could be found, but nevertheless allow the user to select a country/location. The feature is important for modems that require installation of a device driver that requires a reboot before loading. The WorldPort application adds itself to the run line so that it will be launched when the computer reboots. The run line is well known in the art of programming personal computers and will not be discussed further. When the WorldPort application runs following a reboot, it can configure the modem transparently and give the user a success or failure message.

DefaultUniqueCountryID 516 is used when the country/location identifier or DefaultCountryID 515 is insufficient to represent a unique country/location flag identifier. This occurs when the modem uses a firmware identifier that does not match the unique country/location flag identifier used by the WorldPort application. The default value for this field is −1 meaning that DefaultUniqueCountryID 516 is not used. When DefaultCountryID 515 and DefaultUniqueCountryID 516 have the same value, it indicates that country/location identifier and the country/location flag identifier are the same, meaning that DefaultCountryID 515 must be unique.

While it is possible to offer unique countries/locations, some modems may require certain choices be mapped into a single value. Nevertheless, the user is presented with a seemingly comprehensive list of countries/locations. After making the selection, the country/location chosen is mapped into its supported equivalent and the modem is configured based on the mapped value. This mapping is a one way operation. However, LastUniqueCountryID 517 allows for tracking the specific country/location selected as distinguished from its mapped counterpart.

For example, consider a modem manufacturer that groups North America into a single firmware entry because the United States and Canada have similar access requirements for their public telephone networks. DefaultCountryID 515 would represent the firmware entry for North America. If this were the only value available, it would be impossible to tell if the modem had been configured for use in the United States or for use in Canada. As a practical matter, if the configuration software displayed a flag as a visual cue indicating the current configuration, it would be forced to choose from displaying either the U.S. flag or the Canadian flag, a choice that is guaranteed to disappoint one market or the other. With LastUniqueCountryID 517 the WorldPort application can distinguish between a U.S. or Canadian configuration, even though the firmware identifier does not distinguish between the two.

Regions section 520 allows the WorldPort application to limit the display of countries/locations to a particular geographic area. Comments 522*a* illustrate the proper format for entries, with region definitions 524 (North America), 526 (Asia), and 528 (Western Europe) as examples of actual entries. Each defined region is numbered sequentially from zero and includes the text that the WorldPort application displays for the region name. Comments 522*b* describe the format of country/location entries for each region. Region 530 (North America) includes entry 532 for the United States, region 540 (Asia Pacific) includes entry 542 for Japan, and region 550 (Western Europe) includes entries 552 for France, 554 for Germany, and 556 for Spain. Each entry for each region is numbered sequentially from zero and includes the identifier used by the modem for each country/location it supports, the flag identifier for each country, and the country name that should display when the region is selected.

When importing a new country/location configuration as described in step 332 of FIG. 3, the WorldPort application adds the selection to the region specified in the update file according to the above format regarding regions 530, 540, and 550. The entry always appears as the last entry of the region list it is appended to and the WorldPort application will display the entry if the imported country/location is part of the currently displayed region. Where online registration is supported, the entry may include a "1" as shown in entry 532 for use by an online registration program.

It should be noted that the traditional method for updating the countries/locations that a modem supports is through a firmware flash upgrade. This method requires physical access to the modem. Furthermore, firmware upgrades are a fairly significant process that require a relatively complex testing regimen prior to becoming available to the general public. As a result, firmware upgrades usually occur at a slower pace than the one allowed by the WorldPort application's import feature. Therefore, the WorldPort application provides for supporting new countries/locations in less time than traditional methods generally allow.

However, flash upgrades will generally erase a modem's user-defined configuration data. Therefore, firmware upgrades for modems configured from imported data, as described beginning with step 332 of FIG. 3 above, must include additional software. This software must either restore the prior user-defined configuration or configure the modem for a newly supported country/location.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a communication system capable of accessing a public telephone network, a machine-executable method for configuring the communication system to comply with access requirements of the public telephone network comprising the steps of:

selecting a first identifier that corresponds to the access requirements of the public telephone network to be accessed;

selecting a second identifier that corresponds to the actual location of the public telephone network to be accessed;

storing the second identifier, when the second identifier does not correspond to the first identifier, to accurately reflect the location of the public telephone network to be accessed; and setting the communication system to access the public telephone network according to the access requirements corresponding to the first identifier.

2. A method as recited in claim 1 further comprising the step of retrieving the access requirements corresponding to the first identifier from an update file, the update file comprising commands for configuring the communication system.

3. A method as recited in claim 1 further comprising the step of reselecting a first identifier for reconfiguring the communication system to access a public telephone network other than the public telephone network corresponding to the previously selected first identifier.

4. A method as recited in claim 1 wherein the method further comprises the step of selecting the communication system to be configured from among a plurality of communication systems.

5. A method as recited in claim 1 wherein the first identifier is selected by a user of the communication system.

6. A method as recited in claim 1 wherein the first identifier is preselected by a supplier of the communication system.

7. A method as recited in claim 6 wherein the configuration occurs in a manner that is transparent to a user of the communication system.

8. A method as recited in claim 1 wherein the communication system is attached to a computing environment, further comprising the step of querying the computing environment for the first identifier.

9. A method as recited in claim 1 wherein the step of selecting a first identifier allows for selection from every country in the world.

10. In a communication system that includes a modem capable of accessing a public telephone network, a machine-executable method for configuring the modem to comply with access requirements of the public telephone network comprising the steps of:
   selecting a first identifier that corresponds to the access requirements of the public telephone network to be accessed;
   selecting a second identifier that corresponds to the actual location of the public telephone network to be accessed;
   storing the second identifier, when the second identifier does not correspond to the first identifier, to accurately reflect the location of the public telephone network to be accessed; and
   setting the modem to access the public telephone network according to the access requirements corresponding to the first identifier.

11. A method as recited in claim 10 further comprising the step of retrieving the access requirements corresponding to the first identifier from an update file, the update file comprising commands for configuring the communication system.

12. A method as recited in claim 10 further comprising the step of reselecting a first identifier for reconfiguring the modem to access a public telephone network other than the public telephone network corresponding to the previously selected first identifier.

13. A method as recited in claim 10 wherein the first identifier is preselected by a supplier of the communication system.

14. A method as recited in claim 13 wherein the configuration occurs in a manner that is transparent to a user of the communication system.

15. A method as recited in claim 10 wherein the step of selecting a first identifier allows for selection from every country in the world.

16. In a communication system that includes a modem having a data access arrangement (DAA) capable of accessing a public telephone network, a machine-executable method for configuring the DAA to comply with access requirements of the public telephone network comprising the steps of:
   selecting a first identifier that corresponds to the access requirements of the public telephone network to be accessed;
   selecting a second identifier that corresponds to the actual location of the public telephone network to be accessed;
   storing the second identifier, when the second identifier does not correspond to the first identifier, to accurately reflect the location of the public telephone network to be accessed; and
   setting the DAA to access the public telephone network according to the access requirements corresponding to the first identifier.

17. A method as recited in claim 16 further comprising the step of retrieving the access requirements corresponding to the first identifier from an update file, the update file comprising commands for configuring the communication system.

18. A method as recited in claim 16 further comprising the step of reselecting a first identifier for reconfiguring the DAA to access a public telephone network other than the public telephone network corresponding to the previously selected first identifier.

19. A method as recited in claim 16 wherein the first identifier is preselected by supplier of the DAA.

20. A method as recited in claim 19 wherein the configuration occurs in a manner that is transparent to a user of the DAA.

21. In a communication system capable of accessing a public telephone network, a machine-executable system for configuring the communication system to comply with access requirements of the public telephone network comprising:
   means for selecting a first identifier that corresponds to the access requirements of the public telephone network to be accessed;
   means for selecting a second identifier that corresponds to the actual location of the public telephone network to be accessed;
   means for storing the second identifier, when the second identifier does not correspond to the first identifier, to accurately reflect the location of the public telephone network to be accessed; and
   means for setting the communication system to access the public telephone network according to the access requirements corresponding to the first identifier.

22. A system as recited in claim 21 further comprising means for retrieving the access requirements corresponding to the first identifier from an update file, the update file comprising commands for configuring the communication system.

23. A system as recited in claim 21 further comprising means for reselecting a first identifier for reconfiguring the communication system to access a public telephone network other than the public telephone network corresponding to the previously selected first identifier.

24. A system as recited in claim 21 wherein the first identifier is preselected by a supplier of the communication system.

25. A method as recited in claim 24 wherein the configuration occurs in a manner that is transparent to a user of the communication system.

* * * * *